United States Patent
Secondi et al.

(10) Patent No.: US 12,533,590 B2
(45) Date of Patent: Jan. 27, 2026

(54) AUTOMOTIVE COMPETITION METHOD FOR ROAD VEHICLE, RELATIVE APPARATUS AND RELATIVE ROAD VEHICLE

(71) Applicant: FERRARI S.P.A., Modena (IT)

(72) Inventors: Andrea Secondi, Modena (IT); Marco Guglielmo Ribigini, Modena (IT)

(73) Assignee: FERRARI S.P.A., Modena (IT)

( * ) Notice: Subject to any disclaimer, the term of this patent is extended or adjusted under 35 U.S.C. 154(b) by 374 days.

(21) Appl. No.: 18/178,753

(22) Filed: Mar. 6, 2023

(65) Prior Publication Data
US 2023/0285863 A1    Sep. 14, 2023

(30) Foreign Application Priority Data
Mar. 10, 2022    (IT) .................. 102022000004595

(51) Int. Cl.
*A63F 13/65* (2014.01)
*B60K 35/00* (2024.01)
(Continued)

(52) U.S. Cl.
CPC .............. *A63F 13/65* (2014.09); *B60K 35/23* (2024.01); *B60K 35/28* (2024.01); *B60K 35/85* (2024.01);
(Continued)

(58) Field of Classification Search
None
See application file for complete search history.

(56) References Cited

U.S. PATENT DOCUMENTS

| 2016/0321940 | A1  | 11/2016 | Banga |
|---|---|---|---|
| 2020/0255026 | A1* | 8/2020  | Katardjiev ....... G08G 1/096741 |
| 2022/0242450 | A1* | 8/2022  | Sokolov ............ G06Q 10/0635 |

FOREIGN PATENT DOCUMENTS

| EP | 3138752 A2 | 3/2017 |
|---|---|---|
| EP | 3831683 A1 | 6/2021 |

(Continued)

OTHER PUBLICATIONS

Chinmay Vilas Samak, et al: "Autonomous Racing using a Hybrid Imitation-Reinforcement Learning Architecture", arxiv.org, Cornell University Library, 201 Olin Library Cornell University Ithaca, NY 14853, Oct, 11, 2021 (Oct. 11, 2021 ), XP091075911, 10 pages.
(Continued)

*Primary Examiner* — Lawrence S Galka
(74) *Attorney, Agent, or Firm* — CANTOR COLBURN LLP (57) ABSTRACT

An automotive competition method for having at least a first real road vehicle and a second virtual road vehicle race with each other; the method comprises the steps of: defining a virtual space, comprising a virtual track, on which a virtual projection of the first road vehicle and the second road vehicle race together; moving the virtual projection of the first road vehicle in the virtual space according to actions imparted by a driver to the first road vehicle; transmitting to the driver data related to the movement of the second road vehicle in the virtual space by means of an interface device indicating at least the position on the virtual track of the second road vehicle with respect to the position of the projection of the first road vehicle on the virtual track.

18 Claims, 6 Drawing Sheets

(51) Int. Cl.
*B60K 35/23* (2024.01)
*B60K 35/28* (2024.01)
*B60K 35/85* (2024.01)
*B60K 35/25* (2024.01)

(52) U.S. Cl.
CPC .................. *A63F 2300/8017* (2013.01); *A63F 2300/8082* (2013.01); *B60K 35/25* (2024.01); *B60K 2360/177* (2024.01); *B60K 2360/589* (2024.01)

(56) References Cited

FOREIGN PATENT DOCUMENTS

| EP | 3668742 | B1 | 11/2021 |
| WO | 2020229841 | A1 | 11/2020 |

OTHER PUBLICATIONS

Italian Search Report for Application No. 102022000004595; Filing Date: Mar. 10, 2022; Date of Mailing—Oct. 26, 2022, 7 pages.

* cited by examiner

AUTOMOTIVE COMPETITION METHOD FOR ROAD VEHICLE, RELATIVE APPARATUS AND RELATIVE ROAD VEHICLE

CROSS-REFERENCE TO RELATED APPLICATIONS

This patent application claims priority from Italian patent application no. 102022000004595 filed on Mar. 10, 2022, the entire disclosure of which is incorporated herein by reference.

TECHNICAL FIELD

The invention relates to an automotive racing method for a road vehicle. Furthermore, the invention also relates to a relative apparatus and to a relative road vehicle.

In particular, the invention can advantageously, though not exclusively be applied to a high-performance road vehicle, to which explicit reference will be made in the description below without because of this losing in generality.

BACKGROUND OF THE INVENTION

Generally speaking, speed limits on roads open to traffic are much lower than the actual performances offered by a car, especially in case of a high-performance sports car. As a consequence, when normally driving on a road, only a small part of the actual capacities of a high-performance sports car is used.

For this reason, it frequently happens that the owner of a high-performance sports car decides to make some laps on a track, so as to try and fully enjoy the performances offered by the car.

However, the owner of a sports car, who usually is an amateur (non-expert) driver, hardly manages to qualify for actual car races, since, in the light of the great risks generated by high speeds, they are usually reserved to professional drivers.

Furthermore, the organization of an open amateur race or a race among friends seems difficult, since the costs of a high-performance vehicle are not necessarily easy to be borne or dealt with by the friends of the aforesaid owner and a sufficient number of amateur drivers might not actually be present on site.

In addition, even in case some friends or acquaintances turn out to own a high-performance sports vehicle, the organization from a logistic point of view could end up being complicated in terms of transporting the vehicles to the track, especially if the owners live in the city or in different continents.

Therefore, the owner of a high-performance vehicle usually makes some laps on the track alone, taking the times of other users as a reference, namely without the adrenaline of an actual race (with each car seeking to overtake the others) and without having the chance to acknowledge when, while driving along the track, his/her performance exceeds the reference performance (namely, when the overtaking ideally takes place).

Patent WO2020229841 discloses a hybrid platform, which implements a merging between real world and virtual world in order to test self-driving cars or have self-driving cars race against one another.

Patent US2016321940 discloses a training system to prepare drivers for emergencies through simulation.

Patent EP3138752 discloses a driver-assistance system for a driver in a race track.

Patent EP3831683 discloses a high-performance driver-assistance system.

Patent EP3668742 discloses a driver-assistance method.

An object of the invention is to provide an automotive racing method, a relative apparatus and a relative road vehicle, which are at least partially free from the drawbacks described above and, at the same time, are simple and economic to be implemented and manufactured.

SUMMARY

According to the invention, there are provided an automotive racing method, a relative apparatus and a relative road vehicle as claimed in the independent claims attached hereto and, preferably, in any one of the dependent claims directly or indirectly depending on the independent claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

DETAILED DESCRIPTION

With reference to the accompanying figures, number 1 indicates, as a whole, an automotive racing apparatus according to embodiments of the invention.

In the figures, the same numbers and the same reference letters indicate the same elements or components with the same function.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

Hereinafter, the term "real" is used to indicate physical objects that have an actual existence and consistency (in other words, can be touched). On the other hand, the term "virtual" is used, hereinafter, to indicate an object obtained through computer processing, which, despite following realistic models, does not reproduce a real situation.

The apparatus 1 comprises a real driving system 2, which comprises, in turn, a real road vehicle 3. The road vehicle 3 is, for example, though not in a limiting manner, a high-performance sports car.

Preferably, though not in a limiting manner, the real road vehicle 3 is always driven by a driver during the race. In other words, preferably, though not in a limiting manner, the real road vehicle 3 is not a self-driving vehicle.

In particular, the road vehicle 3 is provided with two front wheels 4 and two rear wheels 4 (in particular, drive wheels). The vehicle 3 is further provided with a passenger compartment 5, which is designed to accommodate at least one driver DR and one or more passengers and is configured to be driven by the driver DR, when he/she is inside the passenger compartment 5.

Furthermore, the apparatus 1 comprises a virtual driving system 6, which comprises, in turn, a virtual road vehicle 7. In particular, the virtual road vehicle 7 consists of a computer creation (for example, a render, a 3D model, etc.), which draws inspiration from any real or fantasy road vehicle.

Advantageously, the apparatus 1 is configured to have the real road vehicle 3 and the virtual road vehicle 7 race against each other.

Advantageously, the apparatus comprises a communication system 8 between the real driving system 2 and the virtual driving system 6. In particular, the communication system 8 is configured to exchange data between the real driving system 2 and the virtual driving system 6.

Furthermore, the apparatus 1 comprises a control system 9, in particular locally present on board the road vehicle 3 or remote, for example present in a server to which the road vehicle 3 is connected by means of the communication system 8. The control system 9 is configured to define a (preferably three-dimensional) virtual space VS comprising a virtual track 10 (shown, for example, in FIG. 2), on which to have a virtual projection 11 of the real road vehicle 3 and the road vehicle 7 race together. In particular, though not in a limiting manner, the projection 11 of the road vehicle 3 is an (exact) digital representation of the real road vehicle 3.

Figure 1:
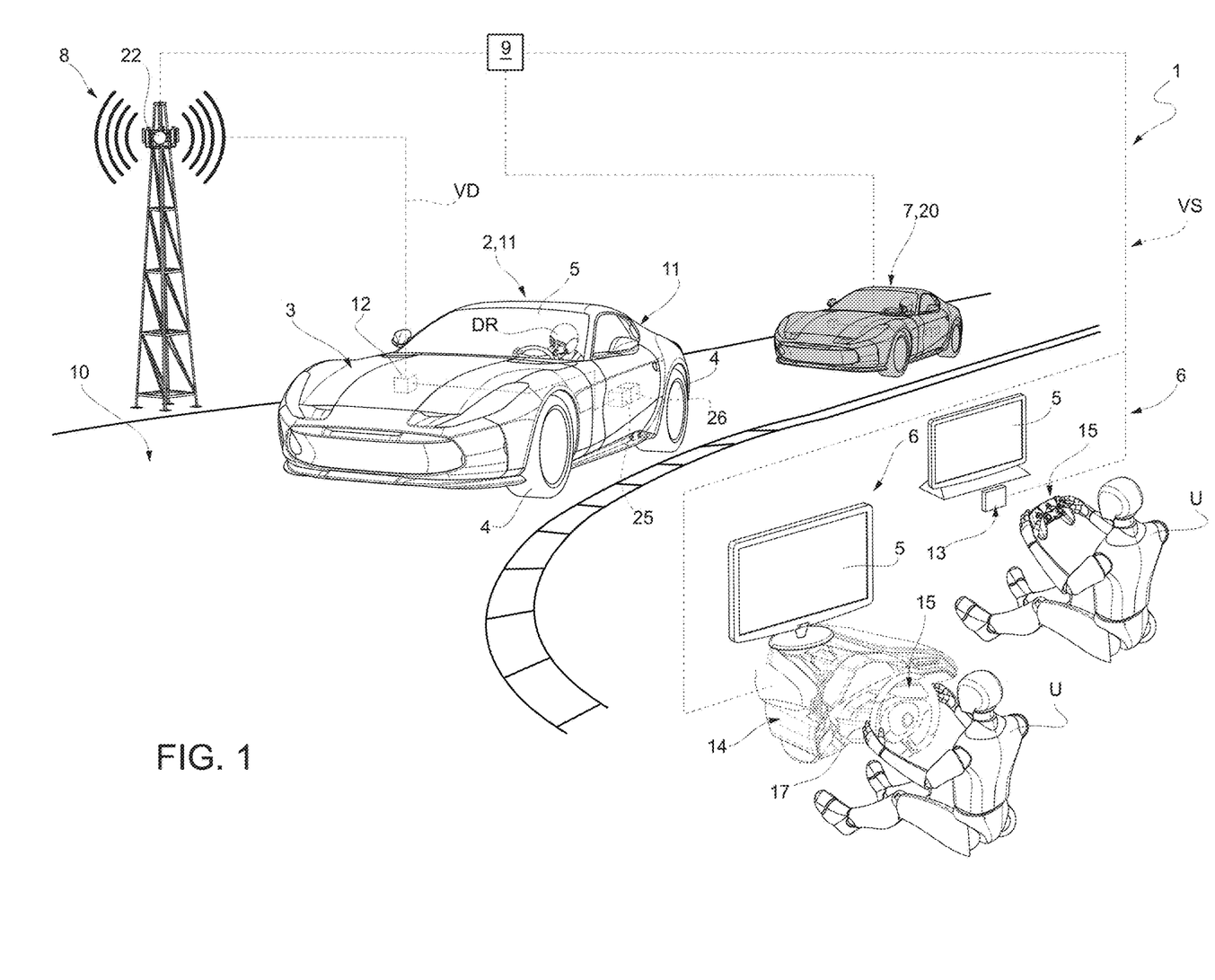
FIG. 1 shows a first schematic view, with some details left out for greater clarity, of an automotive racing apparatus according to an embodiment of the invention.

Preferably, according to non-limiting embodiment of FIG. 1, the real road vehicle 3 comprises a control unit 12 configured to detect and transmit to the control system 9 a plurality of vehicular data VD, said data being a function of actions imparted by the driver DR to the real road vehicle 3.

In some non-limiting cases, the control system 9 is integrated on board the real road vehicle 3; in other non-limiting cases, the control system 9 is remote relative to the road vehicle 3, with which it communicates by means of the communication system 8.

In particular, the unit 12 is an electronic control unit ("ECU"), which, among other things, processes a plurality of data and adjusts the behaviour of the road vehicle 1 both on a straight road and along a bend. The control unit 10 can physically consist of one single device or of several devices separate from one another and communicating with one another (for example, though not in a limiting manner) through the CAN or Ethernet network of the real road vehicle 3.

Advantageously, in order to allow the race to take place, the control system 9 is configured to move the virtual projection 11 of the real road vehicle 3 in the virtual space VS as a function of the actions imparted by the driver DR to the real road vehicle 3.

According to some non-limiting embodiments, like the one shown in FIG. 1, the virtual driving system 6 comprises a video game console 13 (of the known kind and, therefore, not described in detail below), a video game (or any similar program) and/or a simulator 14. In particular, the virtual driving system 6 (namely, both the console 13 and the simulator 14) is provided with a respective screen S and with an interface system 15, for example a joystick 16 or a driver's cockpit 17 (for example, provided with a steering wheel, pedals and a seat), which allows a user U to control the virtual road vehicle 7.

Advantageously, though not necessarily, in general, the screen S is configured to allow the user U to see the three-dimensional virtual space VS or a graphic representation thereof.

According to other non-limiting embodiments which are not shown herein, the virtual driving system 6 comprises a memory support (locally present on board the road vehicle 3 or remote, for example present on a server to which the road vehicle 3 is connected), on which a previously recorded performance is stored. In this way, the driver DR can race both against previous performances of his/hers and against performances of other users U who cannot simultaneously use the virtual driving system. In some non-limiting cases, the previously recorded performances are famous performances, so as to have the driver DR race against leading drivers.

According to some non-limiting embodiments, the previously recorded performances are processed as a function of past videos. For example, the performance of a Formula1® world champion can be reconstructed instant by instant starting from the videos of the performance itself.

Figure 4:
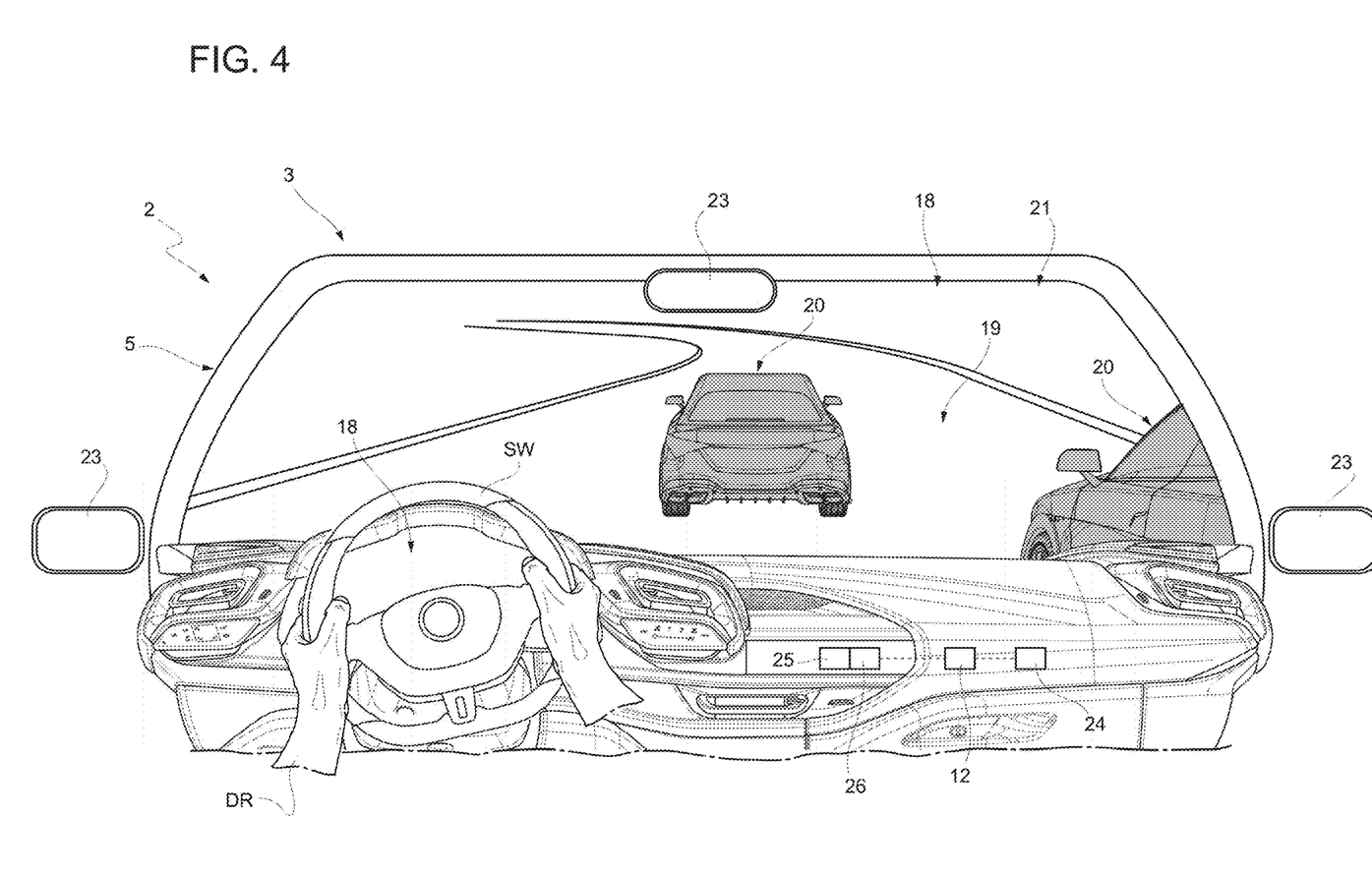
FIG. 4 shows a possible second view of the car race of FIG. 3 of a user equipped with a road vehicle on the track.

According to some preferred, though non-limiting embodiments, like the one shown in FIG. 4, the real driving system 2 comprises an interface device 18 configured to indicate at least the position P' in the virtual space VS (in particular, on the virtual track 10) of the virtual road vehicle 7 relative to the position P of the projection 11 of the real road vehicle in the virtual space VS (namely, on the virtual track 10). In other words, the interface device 18 allows the driver DR to acknowledge, while racing, the mutual position of the projection of the real vehicle 3 and of the virtual vehicle 7, thus understanding when an overtaking takes place or if one vehicle is gaining or losing time relative to the other.

In some non-limiting cases, the apparatus 1 is configured to allow the race to take place when the real vehicle 3 is standing still. In this case, the interface device 18 serves as screen S for the driver DR, namely allows the driver DR to see the (preferably three-dimensional) virtual space VS where the projection 11 of the real vehicle 3 and the virtual vehicle 7 are racing.

In other non-limiting cases, the apparatus 1 is configured to allow the race to take place when the real vehicle 3 is moving, in particular on a real track 19. In this case, the race only starts if the virtual track 10 coincides with the real track 19. For example, the user U has to select, within the video game or the simulator 14, the same track as the one where the vehicle 3 with the driver DR inside the passenger compartment 5 is physically located.

Advantageously, though not necessarily, especially in these last cases, the interface device 18 is an augmented reality device configured to show to the driver DR a virtual projection 20 of the virtual road vehicle 7 on the real track 19. Preferably, in order to allow the race to take place without latencies, the virtual projection 20 of the road vehicle 7 is cyclically updated in real time on the interface device (as a function of the positions P and P' on the virtual track 10).

According to some non-limiting embodiments, the interface device 18 is arranged in the area of a windshield 21. More precisely, the windshield 21 is the interface device 9 (for example, according to the disclosure of Italian patent application 102019000023259 of the Applicant), since it is configured to allow the driver DR to see, on it, the projection 20 of the virtual vehicle 7. In other words, the windshield 21 is configured to project the moving image of the virtual vehicle 7 as if it were on the track 19 together with the real road vehicle 3.

Alternatively or in addition, the interface device 18 is a head-up display (HUD).

In other non-limiting embodiments, which are not shown herein, alternatively or in addition, the interface device 18 comprises communication means other than video, such as, for example, audio signals in the loudspeakers of the vehicle 3, vibrations of a steering wheel SW and/or seat and/or other parts in contact with the driver DR, led lightening, wording on the dashboard, etc.

Alternatively or in addition, the interface device 18 is worn by the driver DR, for example is integrated in a helmet worn by the driver DR in accordance with the disclosure of Italian patent application 102020000004891 of the Applicant.

Alternatively or in addition, the interface device 18 comprises wing mirrors 23, preferably of the electronic kind, configured to project, in augmented reality, the projection 20 of the virtual vehicle 7 in case it is behind the projection 11 of the real vehicle 3, namely allowing the driver DR to see, in the wing mirrors 23, the relative position of the virtual vehicle 7 with respect to the real vehicle 3 during the race.

Advantageously, though not necessarily, the interface device 18 is configured to suggest to the driver DR one or more actions to be made in order to change the lateral and/or longitudinal dynamics, respectively, of the real road vehicle 3 or of the virtual projection 20 thereof (in case of race with the vehicle 3 standing still). In particular, the interface device 18 is (also) configured like the interface device discloses in Italian patent applications 102021000025022 and/or 102021000025037, namely so as to suggest to the driver actions to the made and so as to provide him/her with light and/or haptic feedbacks to improve his/her performance.

Alternatively or in addition, the interface device 18 is configured to suggest to the driver errors predicted (for example, by the control unit) as a function of previous laps and/or of an estimation of the driving ability of the driver DR. By way of example, in case the vehicle 3 realises that the driver DR makes the same mistake for a given number of laps, it suggests, through the interface device 18, how to avoid making that same mistake again.

Advantageously, though not necessarily, the communication system 8 comprises wireless data transmission elements 22 configured to transmit and/or receive data (for example, transmitted by the control unit 12 and/or by the virtual driving system) in the form of centimetre or millimetre waves. In particular, the data transmission elements 22 preferably are devices that use a mobile phone technology, in particular configured to carry out a so-called network slicing (which is a known concept and, therefore, will not be described in detail hereinafter). More in particular, the transmission elements 22 are configured to operate according to the 5G or 6G standard. In this way, it is possible to ensure a real-time update of the positions P and P' of the projections 11 and 20, respectively, of the real vehicle 3 in the virtual space VS (and on the screen S) and of the virtual vehicle 7, for example on the interface device 18.

Figure 6:
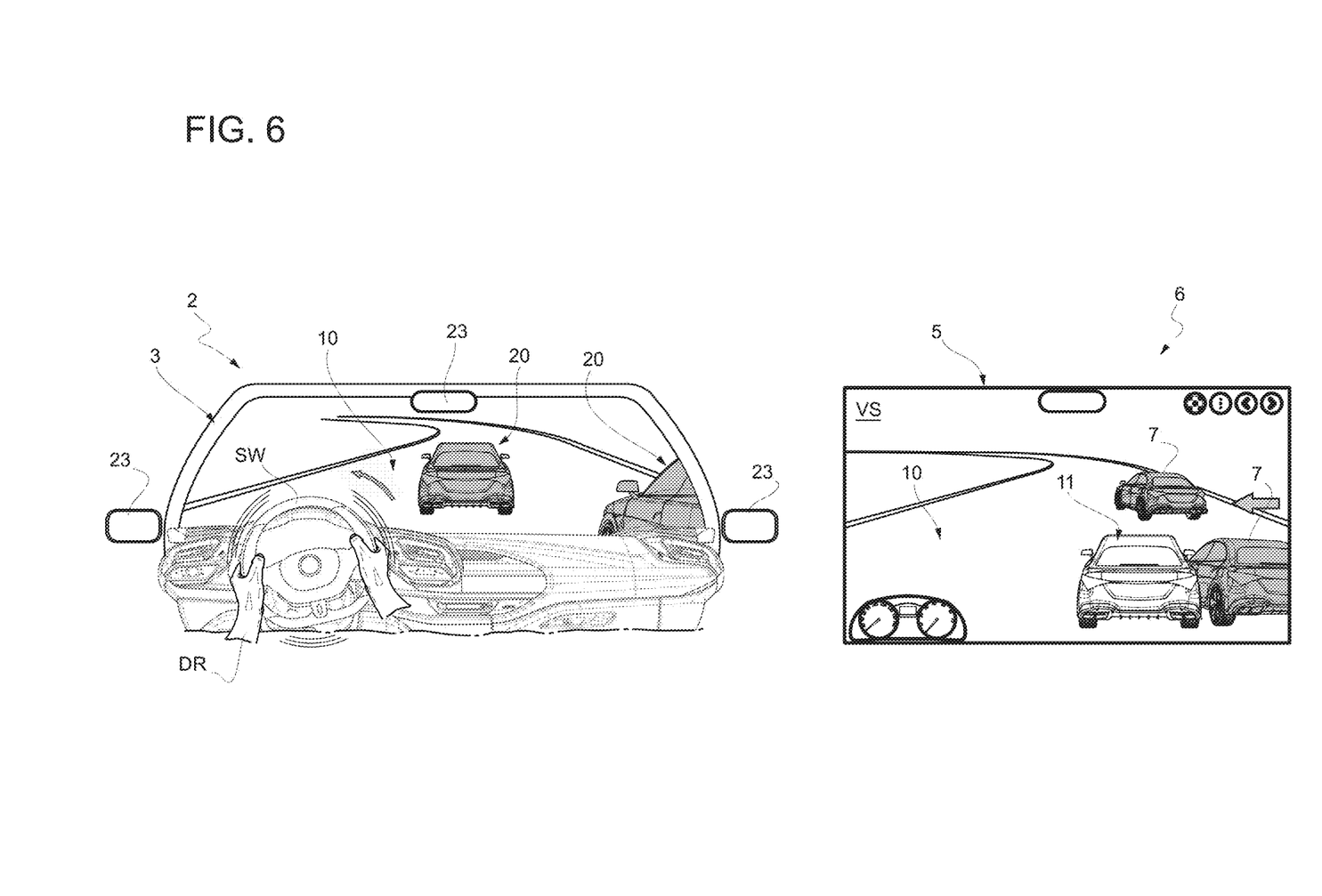
FIG. 6 shows a possible second racing situation, in which the actions imparted to a virtual vehicle propagate to a real corresponding item.

According to some preferred non-limiting cases, like the one shown in FIG. 6, in the presence of a contact in the virtual space VS between the virtual projection 11 of the real road vehicle 3 and the virtual road vehicle 7, the real road vehicle 3 comprises actuator means 24 configured to provide the driver DR with a haptic feedback (in particular, by having the seat and/or the steering wheel SW vibrate entirely or asymmetrically on the side where the contact takes place), an acoustic feedback (for example, by emitting a strong impact noise from the loudspeakers of the road vehicle 3) and/or a change in the longitudinal dynamics (for example, by operating a brake pedal in case of a front impact or an accelerator pedal in case of a rear impact) and/or in the lateral dynamics of the road vehicle (for example, by operating an actuator connected to the steering wheel, which laterally deflects it, thus changing the trajectory of the road vehicle 3).

Advantageously, though not necessarily, the control unit 12 comprises a localization system 25 for the real road vehicle 3, which is configured to localize (with a preferably centimetre-like precision) the real road vehicle 3 on the real track 19.

Preferably, alternatively or in addition, the control unit 12 comprises an inertial measurement unit 26 (IMU) of the known kind, which, therefore, is not described in detail below.

In particular, the vehicle data VD transmitted by the control unit 12 to the control system 9 is detected both by the localization system 25 and by the inertial measurement unit 26.

According to some non-limiting embodiments, the apparatus is configured to store, in a suitable memory support, the performance/view of the driver DR so that he/she can re-watch it, for example on a smartphone, in order to improve future performances on the same track.

According to a further aspect of the invention, there is provided an automotive racing method to have at least a first road vehicle and a second road vehicle race against one another; wherein the first road vehicle is the real vehicle 3 and the second road vehicle is the virtual vehicle 7.

The apparatus 1 and the real vehicle 3 are preferably configured to carry out at least part of the method described below.

The method comprises, first of all, the step of defining the virtual space VS, which preferably is a three-dimensional virtual space, as schematically shown in the non-limiting embodiment of FIG. 1.

The virtual space advantageously comprises the virtual track 10, on which the projection 11 of the real vehicle 3 and the virtual vehicle 7 race (in the same moment).

Furthermore, in order to allow the race to take place, the method entails moving the virtual projection 11 of the real vehicle 3 in the virtual space VS as a function of the actions imparted by the driver DR to the real vehicle 3. In other words, the driver DR interacts with the real vehicle 3, using it as interface system to move the projection 11 of the real vehicle 3.

In some non-limiting cases, which are not shown herein, the movement of the projection 11 does not coincide with the movement of the real vehicle 3, namely the real vehicle 3 remains still during the race and only serves as controller for the projection 11.

Figure 5:
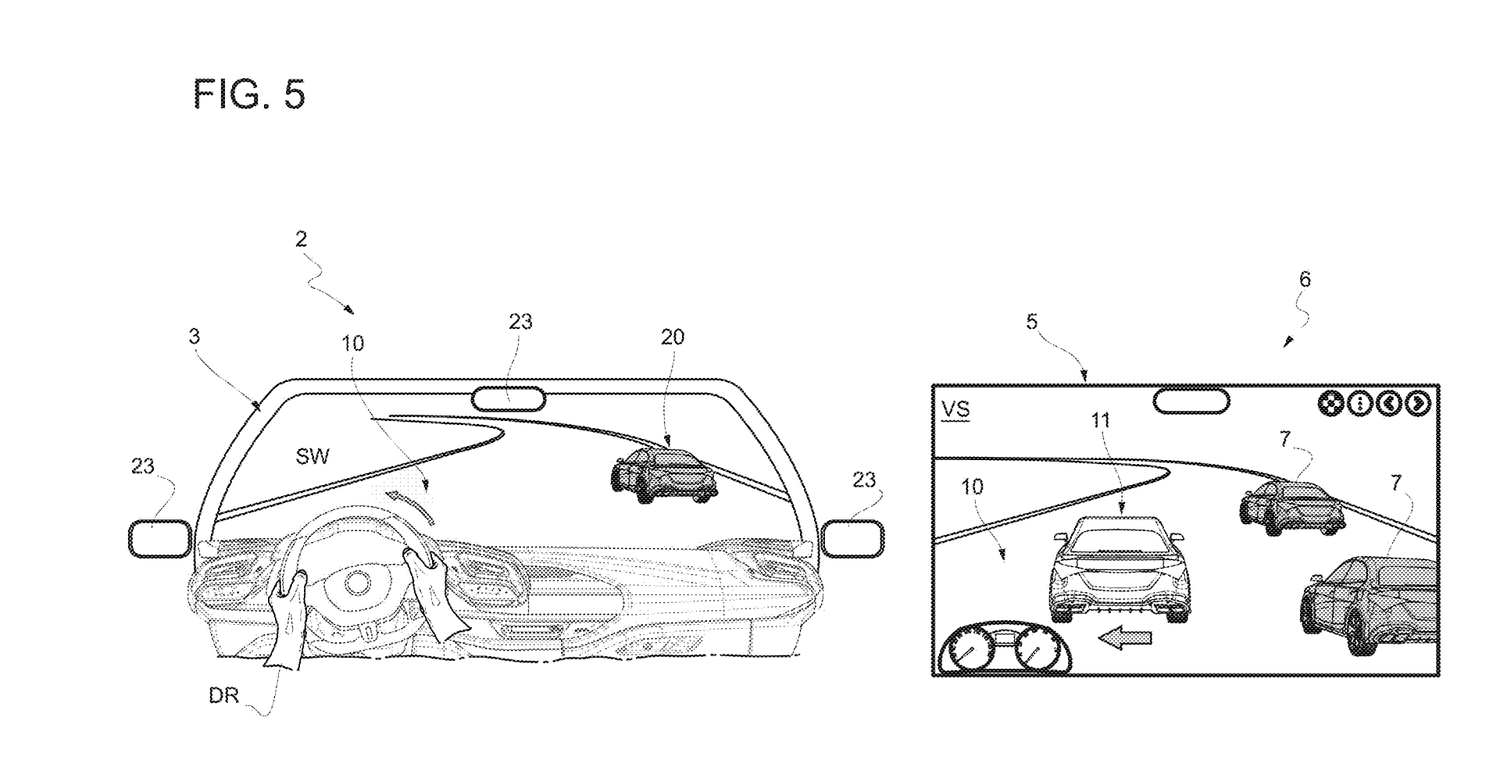
FIG. 5 shows a possible first racing situation, in which the actions imparted to the road vehicle propagate to a virtual corresponding item.

In other non-limiting cases, like the ones shown in FIGS. 4 to 6, the movement of the projection 11 corresponds to the movement of the real road vehicle 3 on the real track 19.

Advantageously, the method further comprises the step of transmitting to the driver DR data concerning the movement of the second road vehicle, namely of the virtual vehicle 7, by means of the interface device 18, which indicates at least the position P' on the virtual track of the virtual road vehicle 7 with respect to the position P of the projection 20 of the real road vehicle 3 on the virtual track 10.

According to some non-limiting embodiments, the data concerning the relative movement of the virtual vehicle 7 transmitted to the driver by means of the interface device 18 only is (light, acoustic, visual or haptic) signals of a made or suffered overtaking.

According to other preferred non-limiting embodiments, the data concerning the relative movement of the virtual vehicle 7 (transmitted to the driver by means of the interface device 18) is substantially exact images in augmented reality of the virtual vehicle 7 through the projection 20 and its cyclical update, preferably in real time. As a matter of fact, the interface device 18 preferably shows to the driver DR, by means of an augmented reality device, the virtual projection 20 of the second road vehicle 7 on the real track 19.

Hence, advantageously, though not necessarily, in case the real vehicle 3 drives along a real track 19, the virtual projection 11 of the real road vehicle 3 is moved, in the virtual space VS, as a function of the real movements of the road vehicle 1 on the real track 19 corresponding to the virtual track 10. In other words, the movements made by the real vehicle 3 on the real track 19 are exactly reproduced, in real time, in the virtual space VS and, therefore, are displayed to the user U through the screen S.

For example, according to the disclosure above, the driver DR and the user U are in two hypothetically distance places, even thousands of miles far from one another, but connected to one another, for example, through the internet and through the communication device 8.

According to some preferred, though non-limiting embodiments, the method further comprises the step of cyclically detecting the position of the real road vehicle 7 relative to the real track 19 (namely, defining, instant by instant, where the real vehicle 3 is located on the real track 19) and, as a consequence, cyclically updating (preferably, in real time or, anyway, with a latency below 500 milliseconds) the position P of the virtual projection of the real road vehicle 3 relative to the virtual track 10 (namely, in the virtual space VS).

In addition, though not in a limiting manner, the method entails, in an equivalent way, cyclically detecting the position P' of the virtual road vehicle 7 relative to the virtual track 10 (namely, in the virtual space VS) and, as a consequence, cyclically updating the position of the virtual projection 20 of the road vehicle 7 relative to the real track 19 (for example, by moving the projection 20 on the windshield or on the wing mirrors of the road vehicle 3 by means of the interface device 18, in case it comprises augmented reality elements).

As mentioned above, advantageously, though not in a limiting manner, the above-mentioned steps of cyclically updating the virtual projections 11 and 20 of the first road vehicle and of the second road vehicle take place in real time, in particular by exchanging data through the wireless communication system 8 (for example, comprising at least an antenna and/or a 5G or 6G mobile phone network or a Wi-Fi network).

In some preferred non-limiting cases, the method further comprises the step of automatically and cyclically measuring the dynamic data of the real road vehicle 3 and/or of the virtual road vehicle 7 and using it to automatically and/or cyclically update the orientation and the dynamics of the virtual projection 11 of the real road vehicle 3 (in the virtual space VS) and/or of the virtual projection 20 of the virtual road vehicle 7 projected by the interface device 18 onto the real track 19. In particular, though not in a limiting manner, the dynamic data of a vehicle is, for example: speed and acceleration of the vehicle (both in a longitudinal and in a transverse direction); emitted torque, gear, number or revolutions per minute of the engine and derivatives thereof, position of the pedals (brake, accelerator and possible clutch), driving mode (racing, city, sports, eco); open/closed hardtop; position of the steering wheel SW, etcetera.

Advantageously, though not necessarily, the method further comprises the step of providing driving suggestions to the driver DR regarding how and/or when to overtake the virtual road vehicle 7, and/or how and/or when to defend against an overtaking of the virtual road vehicle 7. In other words, the interface device 18 is configured to suggest to the driver DR the manoeuvres to be made in order to overtake, in a given segment of the track 10, 19, a vehicle against which it is racing.

According to non-limiting embodiments, the method further comprises the further step of suggesting to the driver DR, by means of the interface device 18, one or more actions to be performed in order to change the lateral dynamics and/or the longitudinal dynamics, respectively, of the real road vehicle 3.

Preferably, though not in a limiting manner, the actions to be made are suggested in accordance with the disclosure of Italian patent applications 102021000025022 and/or 102021000025037 of the Applicant.

Advantageously, though not necessarily, alternatively or in addition, the method further comprises the further step of suggesting to the driver DR, by means of the interface device 18, one or more actions to be performed by predicting driver's driving errors as a function of previous laps and/or of an estimation of the driver's driving skill. To this regard, the actions to be performed can be suggested as indicated by the term "corrective actions" in Italian patent applications 102019000023232 and 102019000023244 of the Applicant.

Furthermore, alternatively or in addition, the driving skill of the driver DR and the suggested actions are processed as disclosed in Italian patent application 102019000023259 of the Applicant.

According to the preferred, though non-limiting embodiment of FIG. 1, the virtual vehicle 7 is controlled in real time by a user U by means of the virtual driving system 6, in particular through a console 13 8*a* video game) or a simulator 14.

In other non-limiting cases, which are not shown herein, as mentioned above in relation to the apparatus 1, the method entails having the virtual vehicle 7 be controlled as a function of a performance previously recorded in the aforesaid memory support.

Both control modes applied to the virtual vehicle 7 can be performed, according to the disclosure contained herein, both when the vehicle 3 is standing still and when the vehicle 3 actually runs along a real track 19.

Advantageously, though not necessarily, the method further comprises the step of, in the presence of a contact in the virtual space VS between the virtual projection 11 of the real road vehicle 3 and the virtual road vehicle 7, providing the driver DR, by means of the road vehicle 3 (in particular, by means of the interface device 18), with a haptic feedback (in particular, by having the seat and/or the steering wheel SW vibrate entirely or asymmetrically on the side where the contact takes place), an acoustic feedback (for example, by emitting a strong impact noise from the loudspeakers of the road vehicle 3) and/or a change in the longitudinal dynamics (for example, by operating a brake pedal in case of a front impact or an accelerator pedal in case of a rear impact) and/or in the lateral dynamics of the road vehicle (for example, by operating an actuator connected to the steering wheel, which laterally deflects it, thus changing the trajectory of the road vehicle 3).

According to further non-limiting embodiments, the method entails having a plurality of virtual vehicles 7 race against at least one real vehicle 3, preferably against a plurality of real vehicles 3.

According to some non-limiting embodiments, the method further comprises the step of storing, in a suitable memory support, the performance/view of the driver DR so that he/she can re-watch it, for example on a smartphone, in order to improve future performances on the same track.

Figure 2:
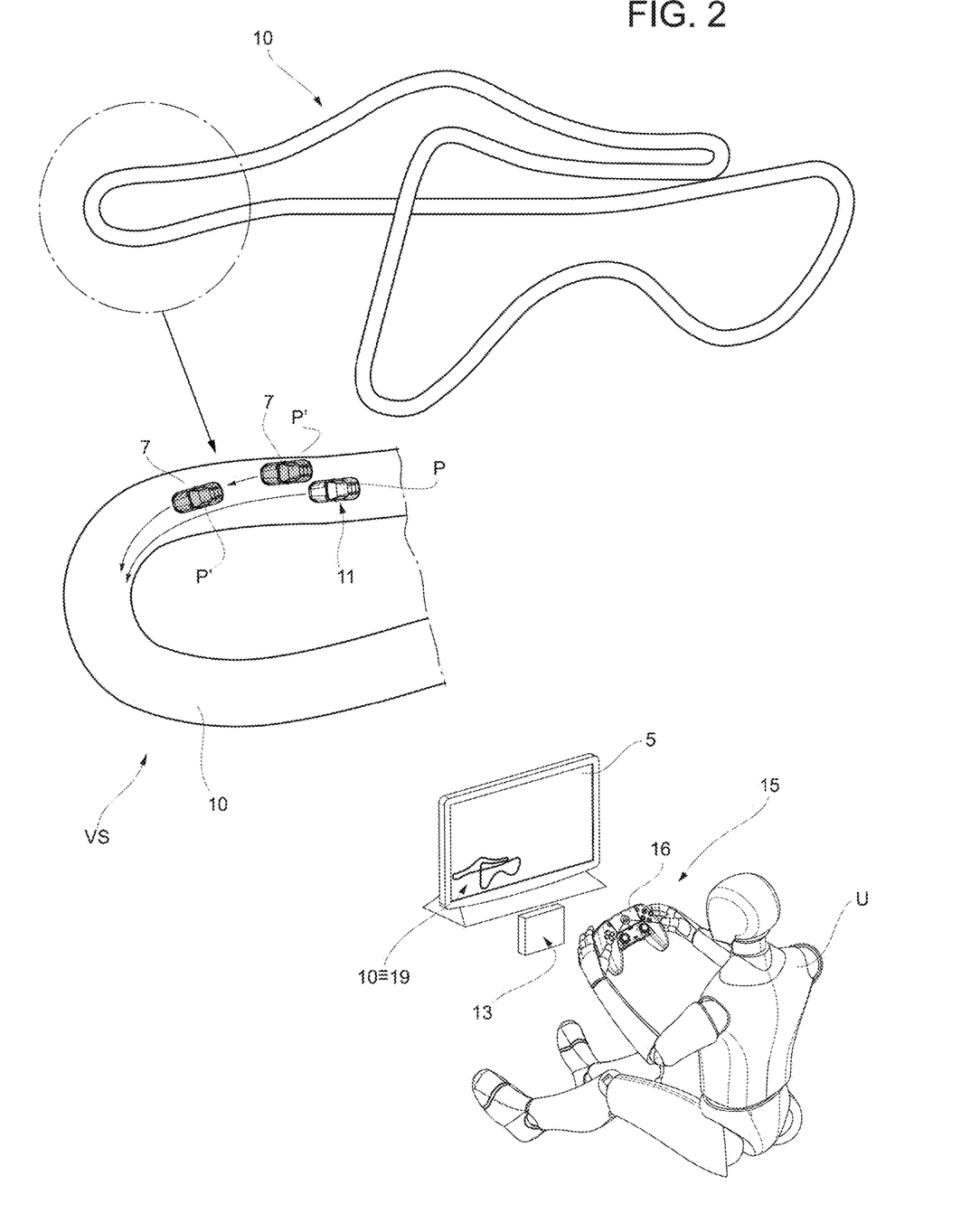
FIG. 2 shows a second schematic view of the apparatus of FIG. 1, where a track used for the race is visible.

In use, the real road vehicle 3 driven by the driver DR races against the virtual road vehicle 7 driven by the user U. The driver DR sees the projection 20 of the vehicle 7 in augmented reality and the user U sees the projection 11 of the vehicle 3 on the screen S, respectively. The respective projections are updated in real time as a function of the actions performed by the driver DR on the vehicle 3 and by the user U, for example on a joystick 16 (as shown in FIGS. 1 and 2).

Figure 3:
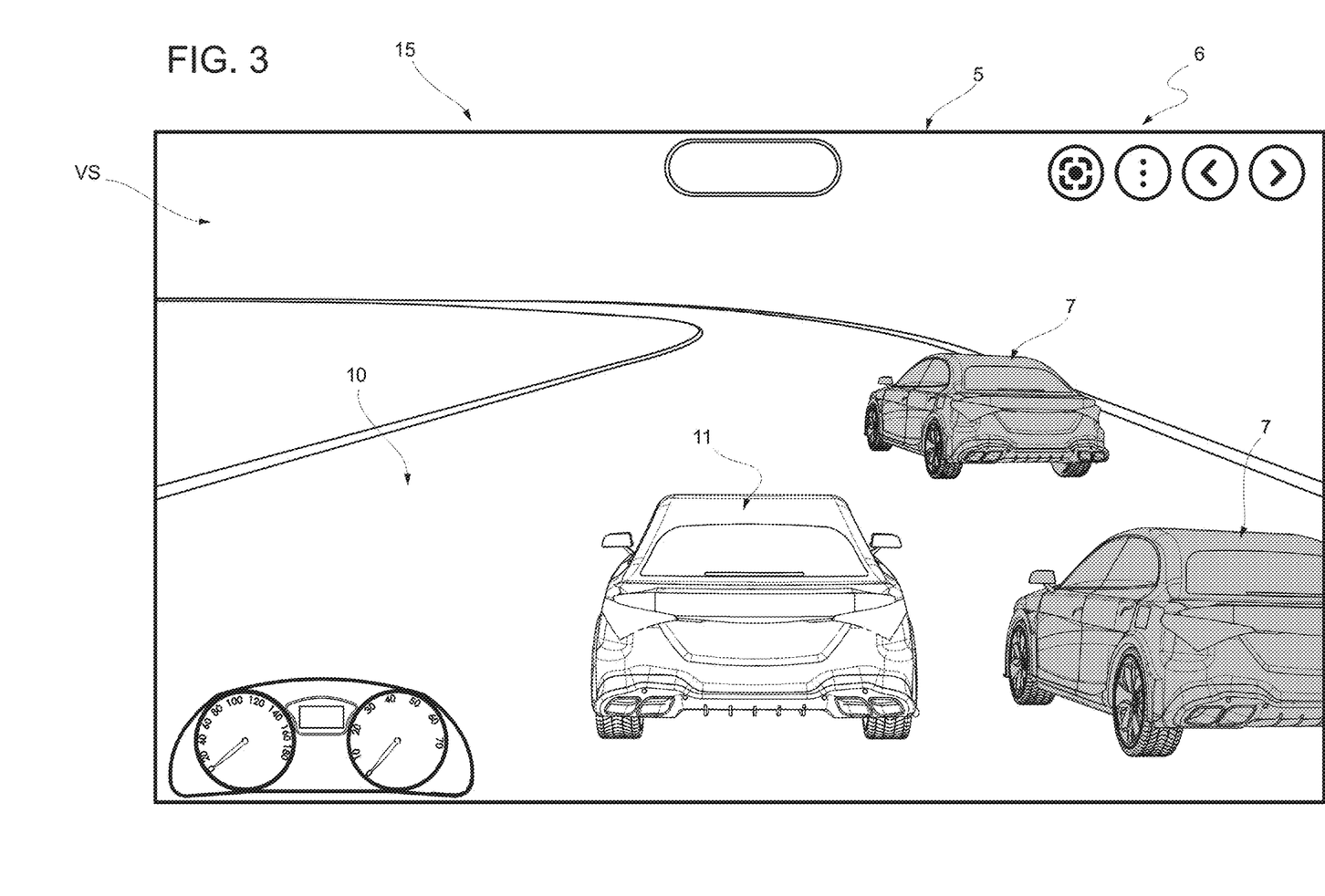
FIG. 3 shows a possible first view of the car race of a user equipped with a digital interface apparatus.

The non-limiting embodiment of FIG. 3 schematically shows the view of a user U in the virtual space VS where two vehicles 7 and the projection 11 of the vehicle 3 race together on the virtual track.

The non-limiting embodiment of FIG. 4, on the contrary, schematically shows the view of the driver DR inside the passenger compartment 5 of the vehicle 3 while driving along the real track 19. In particular, the interface device 18 displays to the driver DR (for example, on the windshield 21 or on a wearable visor, as mentioned above) the projections 20 of the two vehicles 7. Hence, the projections 20 are displayed to the driver DR as augmented reality elements on the real track 19. In can the vehicle 3 virtually had a vehicle 7 behind it, the latter could be displayed by means of a projection on the wing mirrors 23.

The non-limiting embodiments of FIGS. 5 and 6 show two different racing situations.

In particular, the non-limiting embodiment of FIG. 5 shows a driver DR rotating the steering wheel SW in a counterclockwise direction, which determines not only a movement of the vehicle 3 to the left on the real track 19, but also a corresponding movement of its projection 11 on the virtual track 10 in the virtual space VS. In particular, the movements are proportionally equivalent.

On the other hand, the non-limiting embodiment of FIG. 6 schematically shows a situation of lateral contact between the virtual vehicle 7 and the projection 11 of the real vehicle 3. In this case, the actuator means 24 shown in FIG. 4 and described above determine, in the vehicle 3, feedbacks both of the haptic and of the dynamic kind. In detail, the steering wheel SW is causes to vibrate due to the impact in the area of the right side of the road vehicle 3. At the same time, the steering wheel SW is slightly moved by the actuator means 24 in a counterclockwise direction, so as to cause the vehicle 3 to shift to the left because of the impact, thus partially simulating an actual slight impact.

According to some non-limiting embodiments, the virtual vehicle 7 is a one-of-a-kind model, certified, for example, with an NFT (Non-Fungible Token).

At the same time, not in a limiting manner, the virtual projection 11 of the real vehicle in the virtual space preferably is a corresponding NFT of the real vehicle 3.

Even though the invention described above relates to a specific embodiment, it should not be considered as limited to said embodiment, for its scope of protection also includes all those variants, changes or simplifications covered by the appended claims, such as, for instance, a different type of real or virtual road vehicle, a different representation of the projections 11 and 20, a two-dimensional virtual space, different interface or communication systems, etcetera.

The apparatus, the vehicle and the method described above have many advantages.

First of all, they allow several users to join a race from different countries of the world, thus solving the problem of having to travel, even in case of users owning high-perforce road vehicles.

Furthermore, users who could never afford a high-performance road vehicle are allowed to race on a track against actual vehicles potentially driven by acquaintances.

A further advantage of the invention lies in allowing a driver to race not only with other user from all over the world, but also with previous performances of his/hers or of friends or of famous drivers.

In addition, the race is particularly realistic thanks to the exchange of effects between the real world and the virtual world, in accordance with the disclosure above, thus allowing the driver DR to experience a race that is as realistic as possible.

Finally, since the race substantially is easier for the remote user U than for the driver DR, for the former is not subjected to accelerations and does not run any risk in case of contacts, the driver DR is further assisted by the suggestions provided by the vehicle 3 through the interface system 18 on how and when to overtake or, simply, on how to avoid mistakes and, hence, close a gap from a preceding vehicle or leave a following vehicle far behind.

LIST OF THE REFERENCE NUMBERS OF THE FIGURES

1 apparatus
2 real guiding system
3 real road vehicle
4 wheels
5 passenger compartment
6 virtual guiding system
7 virtual road vehicle
8 communication system
9 control system
10 virtual track
11 projection of the real vehicle
12 control unit
13 console
14 simulator
15 interface system
16 joystick
17 cockpit
18 interface device
19 real track
20 projection of the virtual vehicle
21 windshield
22 transmission elements
23 wing mirrors
24 actuator means
25 localization system
26 IMU
DR driver
P' virtual vehicle position
P real vehicle projection position S screen
SW steering wheel
VD vehicle data
VS virtual space

The invention claimed is:

1. An automotive competition method for racing at least one first road vehicle (3) and a second road vehicle (7) with each other; wherein the first road vehicle (3) is a real vehicle and the second road vehicle (7) is a virtual vehicle; the method comprising the steps of:
   defining a virtual space (VS), comprising a virtual track (10), on which a virtual projection (11) of the first road vehicle (3) and the second road vehicle (7) race together;
   moving the virtual projection (11) of the first road vehicle (3) in the virtual space (VS) according to actions given by a driver (DR) to the first road vehicle (3);
   transmitting to the driver (DR) data related to the movement of the second road vehicle (7) in the virtual space (VS) by means of an interface device (18) indicating at least the position (P') on the virtual track (10) of the second road vehicle (7) with respect to the position (P) of the projection (11) of the first road vehicle (3) on the virtual track (10);
   wherein the second road vehicle (7) is driven in real time by a user (U) via a video game or simulator.

2. The automotive competition method according to claim 1, wherein the virtual projection (11) of the first road vehicle (3) is moved, in the virtual space (VS), according to the real movements of the road vehicle 1 on a real track (19) corresponding to the virtual track (10).

3. The automotive competition method according to claim 1, wherein the interface device (18) shows to the driver (DR), by means of an augmented reality device, a virtual projection (20) of the second road vehicle (7) on the real track (19).

4. The automotive competition method according to claim 2, and comprising the steps of:
   cyclically detecting the position (P) of the first road vehicle (3) with respect to the real track (19) and consequently cyclically updating the position (P) of the virtual projection (11) of the first road vehicle (3) with respect to the virtual track (10); and
   cyclically detect the position (P') of the second road vehicle (7) relative to the virtual track (10) and cyclically updating the position (P') of the virtual projection (20) of the second road vehicle (7) relative to the real track (19) accordingly.

5. The automotive competition method according to claim 4, wherein the steps of cyclically updating the position (P) of the virtual projections (11, 20) of the first road vehicle (3) and the second road vehicle (7) take place in real time, in particular by exchanging data via a wireless connection system (8).

6. The automotive competition method according to claim 4 and comprising the further steps of:
   automatically and cyclically detecting the dynamic data of the first road vehicle (3) and/or the second road vehicle (7) and using it to automatically and cyclically update the orientation and dynamics of the virtual projection (11) of the first road vehicle (3) and/or the virtual projection (20) of the second road vehicle (7).

7. The automotive competition method according to claim 6 and comprising the step of providing driving suggestions to the driver (DR) regarding how and/or when to overtake the second road vehicle (7), and/or how and/or when to defend against an overtaking of the second road vehicle (7).

8. The automotive competition method according to claim 6 and comprising the further step of suggesting to the driver (DR), by means of the interface device (18) one or more actions to be performed to vary a lateral and/or longitudinal dynamics of the first road vehicle (3) respectively, in particular by predicting driver driving errors (DR) as a function of previous laps and/or an estimation of the driver driving skill (DR).

9. The automotive competition method according to claim 1, wherein, in the presence of a contact in the virtual space (VS) between the virtual projection (11) of the first road vehicle (3) and the second road vehicle (7), a haptic, acoustic feedback is provided to the driver (DR), via the first road vehicle (3), and/or a variation in the longitudinal and/or lateral dynamics of the road vehicle is generated.

10. An apparatus (1) for motor racing comprising:
   a real driving system (2), which in turn comprises a real first road vehicle (3);
   a virtual driving system (6), which in turn comprises a virtual second road vehicle (7);
   a communication system (8) between the real driving system (2) and the virtual driving system (6), which is configured to exchange data between the real driving system (2) and the virtual driving system (6);
   a control system (9), which is configured to define a virtual space (VS), comprising a virtual track (10), on which to let race together a virtual projection (11) of the first road vehicle (3) and the second road vehicle (7);
   the apparatus (1) being configured to make at least the first road vehicle (3) and the second road vehicle (7) race against each other;
   wherein the first road vehicle (3) comprises a control unit (12) configured to detect and transmit to the control system (9) a plurality of vehicular data (VD), which data is a function of actions imparted by a driver (DR) to the first road vehicle (3);
   wherein the control system (9) is configured to move the virtual projection (11) of the first road vehicle (3) in the virtual space (VS) as a function of actions given by a driver (DR) to the first road vehicle (3);
   wherein the second road vehicle (7) is configured to be driven in real time by a user (U) via a video game or simulator.

11. The apparatus (1) according to claim 10, wherein the real driving system (2) comprises an interface device (18) configured to indicate at least the position (P') on the virtual track (10) of the second road vehicle (7) with respect to the position of the projection (11) of the first road vehicle (3) on the virtual track (10).

12. The apparatus (1) according to claim 10, wherein the connection system (8) comprises wireless data transmission elements (22) configured to transmit and/or receive data in the form of centimetre or millimetre waves.

13. The apparatus (1) according to claim 10 wherein the interface device (18) is an augmented reality device configured to show the driver (DR) a virtual projection (20) of the second road vehicle (7) on a real track (19), in particular, the virtual projection (20) of the second road vehicle (7) being updated cyclically in real time.

14. The appartus (1) according to claim 10, wherein the virtual driving system (6) comprises a video game, a console, a simulator or a memory support on which a previously recorded performance is stored.

15. The apparatus (1) according to claim 10, wherein the first road vehicle (3) comprises actuators means (24) configured, in the presence of a contact in the virtual space (VS) between the virtual projection (11) of the first road vehicle (3) and the second road vehicle (7), to provide the driver (DR) with haptic and/or acoustic and/or light feedback and/or a change in the longitudinal and/or lateral dynamics of the road vehicle.

16. A road vehicle (3) comprising:
    four wheels, of which at least one pair of driving wheels;
    a control unit (12) configured to detect and transmit to a control system (9) a plurality of vehicular data, which are a function of actions imparted by a driver (DR) to the road vehicle (3);
    an interface device (18) configured to indicate at least the position, on a virtual track (10), of a virtual road vehicle (7) with respect to the position of a projection (11) of the road vehicle (3) on a virtual track (10).

17. The road vehicle according to claim 16, wherein the control unit (12) comprises a system (25) for locating the road vehicle (3) on a real track (19) and/or an inertial measurement unit (26) for detecting the dynamics of the road vehicle (3).

18. The road vehicle according to claim 16, wherein the interface device (18) is an augmented reality device configured to perform a projection (20) of the second road vehicle (7) onto a real track (19) travelled by the road vehicle (3).

* * * * *